United States Patent [19]
Botterill et al.

[11] Patent Number: 5,423,235
[45] Date of Patent: Jun. 13, 1995

[54] DEVICE FOR SWITCHING ON A DRIVE TRAIN

[75] Inventors: John R. Botterill, Saarbrücken; Robert Rickell, Siegburg; Eugen Stall, Neunkirchen, all of Germany

[73] Assignee: GKN Automotive AG, Lohmar, Germany

[21] Appl. No.: 768,947

[22] PCT Filed: Jan. 31, 1991

[86] PCT No.: PCT/EP91/00180
§ 371 Date: Dec. 4, 1991
§ 102(e) Date: Dec. 4, 1991

[87] PCT Pub. No.: WO91/12152
PCT Pub. Date: Aug. 22, 1991

[30] Foreign Application Priority Data

Feb. 14, 1990 [DE] Germany ............... 40 04 448.3

[51] Int. Cl.⁶ .................... F16H 1/22; F16H 37/06
[52] U.S. Cl. .................... 74/665 GA; 180/247
[58] Field of Search ............ 180/244, 247, 251; 74/665 F, 665 GA, 665 GE, 665 T

[56] References Cited

U.S. PATENT DOCUMENTS

| | | | |
|---|---|---|---|
| 4,805,486 | 2/1989 | Hagiwara et al. | 192/85 C |
| 4,883,138 | 11/1989 | Kameda et al. | 180/249 |
| 4,895,236 | 1/1990 | Sakakibara et al. | 192/84 R |
| 5,076,112 | 12/1991 | Williams | 74/337.5 |
| 5,150,637 | 9/1992 | Ninomiya et al. | 74/335 |
| 5,199,325 | 4/1993 | Reuter et al. | 180/248 |
| 5,271,478 | 12/1993 | Kameda et al. | 180/247 |
| 5,323,871 | 6/1994 | Wilson et al. | 180/197 |

FOREIGN PATENT DOCUMENTS 3915959 11/1990 Germany.
2008694 6/1979 United Kingdom.

*Primary Examiner*—Dirk Wright
*Attorney, Agent, or Firm*—Harness, Dickey & Pierce

[57] ABSTRACT

A device for switching on a drive train in a motor vehicle has a power divider for several drive trains, one of which is permanently coupled with a drive unit and the other of which can be connected to the drive unit. The device also has an input shaft (2, 42, 82, 142) and an output shaft (4, 44, 84, 144) which can be connected to the input shaft (2, 42, 82, 142) through a switchable coupling (10, 50, 90, 150) in the form of an axially actuated friction clutch. The friction clutch is actuated by two rings (28, 30; 68, 70; 108, 110; 168, 170) which are coaxial with the clutch disks and which can be rotated relative to each other through 180°. One ring is an axially supported support ring (28, 68, 108, 168) and the other ring is a pressure ring (30, 70, 110, 170) which slides axially on one of the shafts. The rings bear against each other on paths which can be varied axially around the periphery.

21 Claims, 6 Drawing Sheets

DEVICE FOR SWITCHING ON A DRIVE TRAIN

BACKGROUND AND SUMMARY OF THE INVENTION

The invention relates to a device for switching on a drive train in a motor vehicle with a power divider for several drive trains. At least one of the drive trains is permanently coupled with a drive unit and at least one drive train can be connected to the drive train unit, one or more of the drive axles and the drive unit. The invention includes an input shaft and an output shaft which can be connected to the input shaft through a coupling in the form of an axially actuated friction clutch.

Devices of this sort are provided in motor vehicles which, under normal conditions, are driven by only the axle or axles of the first drive train. When insufficient traction is on that axle, the axle of the second drive train can be externally switched on. Actuation of the friction clutch can be effected hydraulically, electro-magnetically or electrically.

DE 39 08 478 describes an electrically actuated device which has the disadvantage of having an electric motor with a complex special construction for the purpose of power conversion where the ball pinion arrangement is located within the rotor of the electric motor. Disengagement of these members would expand the axial unit space of the device.

U.S. Pat. No. 4,895,236 discloses an electrically actuated device with a ball pinion arrangement whose rotatably driven member axially shifts to actuate coupling. The rotation drive results through an electric motor situated outside of the housing. For this reason, axial shifting in the rotation drive gear registers high frictional powers. Thus, the hysteresis of the shifting device is disadvantageously high.

The object of the present invention is to provide a device which can be simply and inexpensively actuated, which functions with low friction, and can be easily included in electric motor and motor vehicle control systems.

The solution therefore exists in that, for regular actuation of the frictional clutch, two rings rotatable through 180° of each other are provided in coaxial arrangement to the clutch disks. One of the rings is a rotatable support ring axially supported in a housing. The other ring is a pressure ring which can slide axially on one of the shafts. A circumferential means bears against each ring on paths in the rings which can be varied axially around the ring periphery. The drive of such an actuating unit, which can be propelled by a suitable electric motor, is installed within and externally of the housing. The drive is completely uncomplicated and enables fine control and regular torque distribution between both drive trains, especially in the absence of a mixing differential. The adjustable motor can be externally attached to the housing by flanges. In an advantageous improvement, a portion of the housing can protectively surround the adjustable motor, so that special protection is offered by its complete incorporation in the housing, including protection against dust and moisture.

A first embodiment consists of a cylindrical chamber on the transmission housing which an ordinary electric motor may be fit.

According to a second embodiment, a standard production electric motor, without a motor housing, is supplied directly in a cylindrical chamber on the transmission housing and covered with a lid.

In each case, arrangement of the adjustable motor is preferably with its rotational axis parallel to the driveshaft so that the drive of the shift device can result through a simple spur gear reduction gear. The electrically actuated shifting comes in combination with other aforementioned electrical control systems for motor vehicle engine performance. Such systems are wheel suspension and steering influence which are intended for the new trends in motor vehicles, reticulation network and, as the case may be, a common specification. The shift is extraordinarily friction poor. The frictional powers in the shift drive could be additionally lessened, so that the adjustable motor is effected by pulsating voltage. In the effect of coupling with friction contact, the adjustable motor remains electrically effected in the preferred arrangement while release of the clutch causes a reversal of electricity.

The ring paths are ball grooves with opposing orientation of varying depth from each other around the ring periphery. The balls travel in paths and preferably are bound in a cage element. Additionally, a varying radius can be provided to vary the depths of the grooves, which radius can influence the characteristic of the torsional angle.

According to another simpler construction, ramps can be formed on one of the rings, on which a cam can be slid on the other respective ring. Also, ramps with bevel rollers situated between the cage element can be provided.

In a preferred embodiment, the clutch is built into a common housing with the power divider of the motor vehicle. The input shaft and a constantly driven output shaft are coaxial and rotatably bound with each other. The engageable output shaft is parallel to the input and connected output shaft. The clutch can be situated coaxially with the input shaft or to the engageable output shaft. In the first case, the output side of the clutch is a mounted sleeve which is rotatably mounted across the drive shaft, and is engageable with the output shaft. In the second case, the input shaft of the clutch can be a rotatably mounted sleeve across the engageable output shaft, which is in torsional engagement with the input shaft.

The drive connection of the input shaft to the engageable output shaft can be effected through a spur gear drive, especially with an intermediate wheel, or through a chain drive.

Preferably the shaft of the adjustable motor lies through a plane essentially parallel to the mounted shafts. If the adjustable motor and the clutch lie across each other on sides of the spur gear drive, or respectively of the chain drive, the transmission shaft of the shifting device can be journaled through the catenary or through a hollow wheel of the spur gear. However, the adjustable motor and clutch could lie on the same side of the spur gear drive, or respectively, the chain drive, thus simplifying the construction of the shifting device.

According to another embodiment, the clutch is situated behind a power divider while switching on the drive train, and attached to the power divider through a shaft drive train. The clutch can thus be built in with the differential drive, especially in a common housing with the axle drive.

From the following detailed description taken in conjunction with the accompanying drawings and subjoined claims, other objects and advantages of the present invention will become apparent to those skilled in the art.

DETAILED DESCRIPTION OF THE PREFERRED EMBODIMENTS

Figure 1:
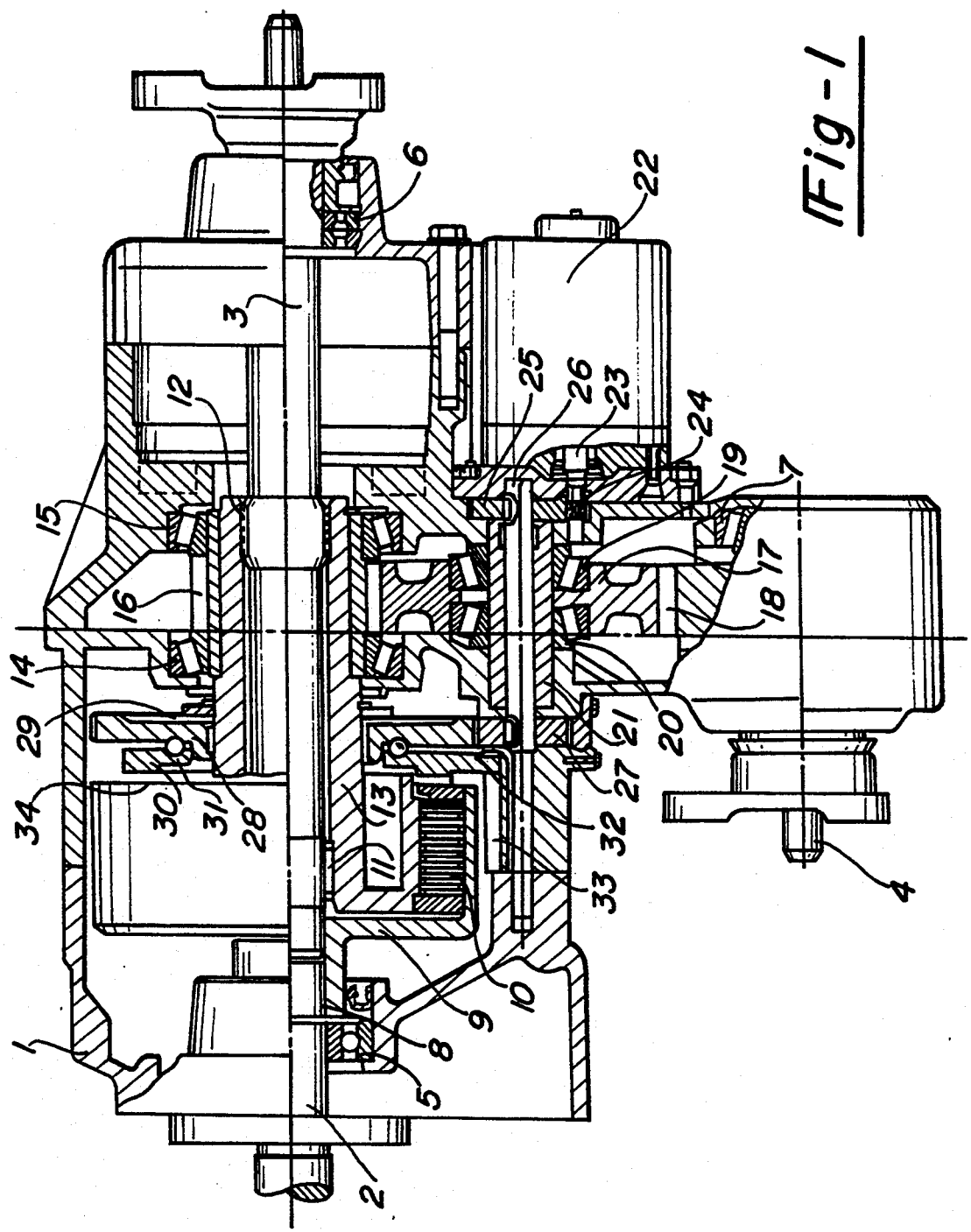
FIG. 1 is a sectional view of a device according to the present invention.

In FIG. 1, a device according to the invention is shown with a multiple member drive housing 1 driven from a motor vehicle engine through a manual or automatic transmission propelled intake shaft 2. A first output shaft 3 is formed unitarily with the input shaft 2. A second output shaft 4 is parallel to the output shaft 3 in housing 1. The shaft 2, 3 is supported in the housing 1 through two radial bearings 5 and 6. A beveled roller bearing 7 acts with a further bearing (not shown) to mount the second output shaft 4. A clutch carrier 9 is non rotatably arranged on the intake shaft 2 through a gear 8. The clutch carrier 9 bears the outer disks of a friction clutch arrangement 10. Further, a sleeve 13 is rotatably mounted on the shaft 2 and 3 by needle bearings 11 and 12. The sleeve holds the inner disks of the clutch arrangement 10. The sleeve 13 is further supported in the housing by two bevel roller bearings 14 and 15 which sit directly on the flanges of the gear wheel 16 on the sleeve 13. A spur gear 17 is in engagement with the gear wheel 16. Also spur gear 17 meshes with a gear wheel 18 on the shaft 4. The spur gear 17 is mounted in two bevel roller bearings 19 and 20 which extend from a sleeve 21 set in the housing. An electrical adjustable motor 22 is externally held on the housing. The motor shaft 23 carries a drive pinion 24, which is in engagement with a gear wheel 25 with which it forms a reduction gear. The gear wheel 25 is fastened to a shaft 26 which is mounted in the sleeve 21. The shaft 26 penetrates the sleeve and carries a further gear wheel 27 on its opposing side. The gear wheel 27 is in engagement with a support ring 28 which is rotatably mounted on the sleeve 13. The support ring 28 is supported over an axial bearing on the sleeve 13. The support ring 28 acts through balls 31 led in counterrotating ball grooves of varying depth on a pressure ring 30 over a radial pin 32. The pin 32 engages an axial nut 33 of the housing 1 and thereby is held axially displaceable and non rotatingly across the housing 1. The pressure ring 30 acts over an axial bearing 34 on the friction clutch arrangement 10 between sleeves 13 and clutch carrier 9.

Due to the unitary connection, when the clutch is not in operation the input shaft 2 only drives the first output shaft 3. Upon actuation of the clutch 10, the input shaft 2 drives the clutch carrier 9 with the sleeve 13, which likewise drives the gears 16, 17 and 18 the second output shaft 4.

Figure 2:
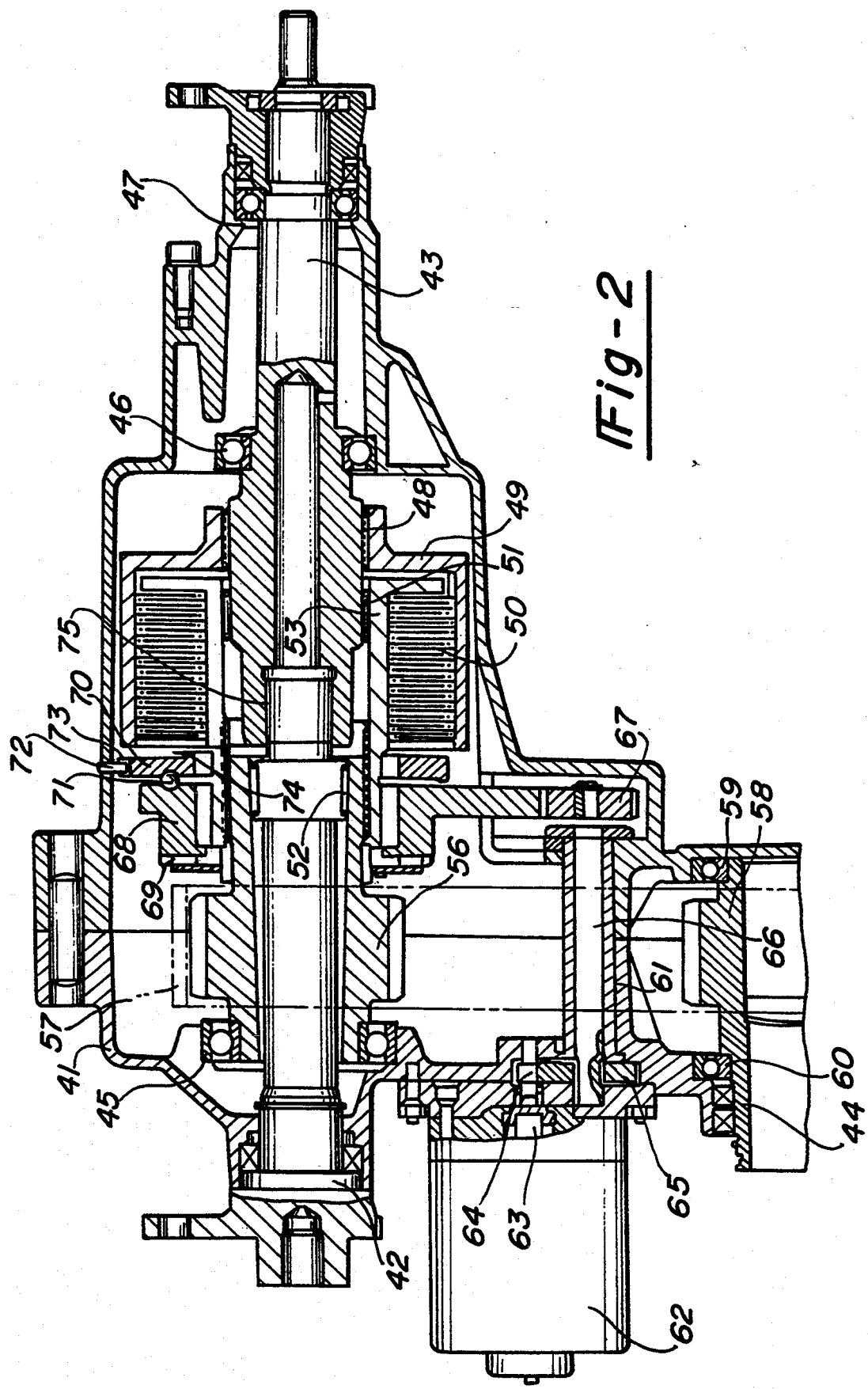
FIG. 2 is a sectional view of another embodiment of the present invention.

In FIG. 2 there is a device according to the present invention with a drive housing 41, an input shaft 42, coupled with a motor vehicle engine over a manual or automatic transmission, a first exit shaft 43, which is coupled through a gear 75, a second output shaft 44, and a clutch carrier 49 coupled with the output shaft 43. This supports the outer flanges of a friction clutch arrangement 50. Further, a sleeve 53 is rotatably mounted on the shaft 42 in a needle bearing 52, which holds the inner flanges of the clutch arrangement 50. The sleeve 53 is further mounted on needle bearing 51 on the shaft 42 and in a radial bearing 45. A gear wheel 56 is coupled with the sleeve 53. A chain 57 is in engagement with the gear wheel 56 and the gear wheel 58 on the shaft 44. The shaft 44 is mounted in two radial bearings 59, 60. An electric adjustable motor 62 is affixed externally with flanges on the drive housing. The motor shaft 63 includes a drive pinion 64, which is in engagement with a gear wheel 65. The gear wheel 65 is fastened on the shaft 66, mounted in a sleeve 61. The shaft 66 penetrates the sleeve and has a second gear wheel 67 on its opposing side. The gear wheel 67 is in engagement with a support ring 68 which is rotatably mounted on the sleeve 53 and is supported through an axial bearing 69 on the sleeve 53. The support ring 68 operates over balls led in counterrotating ball grooves of varying depth on a pressure ring 70. An axial nut 73 is provided which engages a radial pin 72 in the housing 41 and is consequently held axially displaceable and non rotatable across the housing 41. The pressure ring 70 acts over an axial mounting 74 on a friction clutch arrangement 50 between the sleeve 53 and clutch carrier 49.

Figure 3:
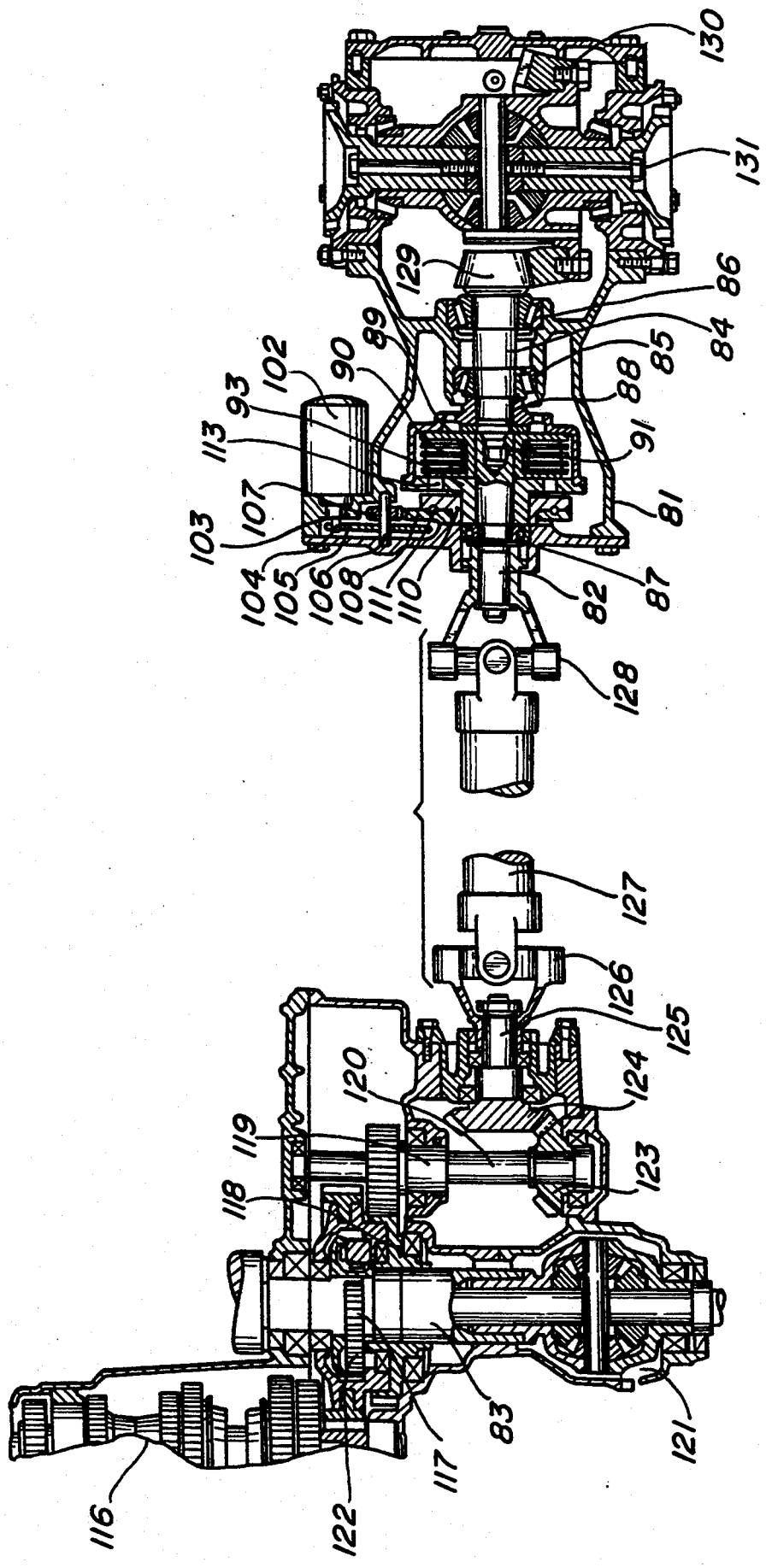
FIG. 3 is a partially sectional view of another embodiment of the present invention.

In FIG. 3 a device according to the present invention is shown with a housing 81. The housing 81 conjointly accepts a differential drive 131, while the corresponding power divider is situated separate from it in a common housing 116 with a shifting drive, which accepts a further differential drive 121. An input shaft 82 and a coaxial output shaft 84 are mounted in the housing 81. The shaft 84 is supported through two bevel bearing 85 and 86 in the housing 81. The input shaft 82 is supported through a ball bearing 87 across the housing and over needle bearing 91 on the output shaft. The clutch carrier 89 is fastened on the output shaft over a gear 88. The clutch carrier 89 carries a first set of disks, while an inner sleeve 93 carries a second set of disks non rotatably bound with the input shaft 82. The disks are axially placed over the pins 113. Support rings 108, supported in the housing, adjust intermediate disks (not individually shown) and axial bearings, acting over balls 111 on the pressure ring 110. Both rings are rotatably mounted on the sleeve 93. An adjustable motor 102 with shaft 103 including pinion 104 is in rotatable drive connection with a gear wheel 105. The gear wheel 105 is mounted on a shaft 106 which includes gear wheel 107 for transference. Gear wheel 107 is in engagement with the support ring 108, which, by its adjustment, actuates adjustment of the transmission 90 through the paths for the balls. The paths have varying depths throughout their periphery in both illustrated rings 108, 110.

The drive of the input shaft 82 results from the shift drive 116 over an intermediate wheel 122, which acts on an outer gear 117 of the outer shaft 83 which outer shaft is fashioned as a hollow shaft. This hollow shaft directly propels an anterior differential drive 121. A gear wheel 118 fastened on the hollow shaft 83 is in engagement with a gear wheel 119 of an intermediate shaft 120. A bevel wheel 123 is coupled with shaft 170 and is in engagement with a bevel wheel 124 on the shaft pin 125. A universal joint 126 is affixed on the shaft pin 125 externally of the housing 116. The joint constantly drives an axial shaft. This is attached with the input shaft 82 of the housing 81 over a further universal joint 128.

Figure 4:
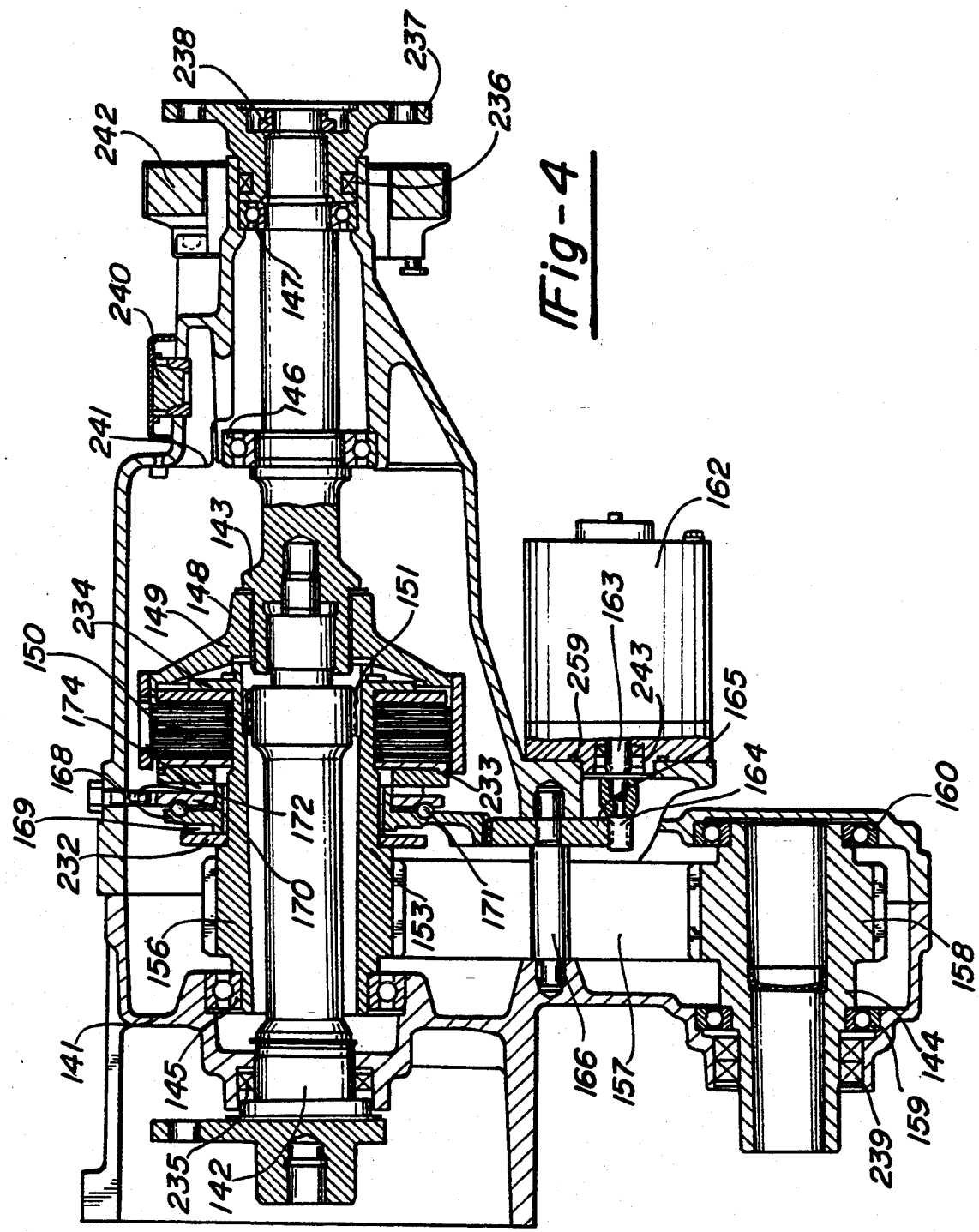
FIG. 4 is a sectional view of another embodiment of the present invention.

In FIG. 4 a device according to the invention is illustrated with a non unitary drive housing 141 in which an input shaft 142, driven by a motor vehicle engine via manual or automatic transmission, a first output shaft 143, which is non rotatingly affixed thereto, and a second output shaft 144, which is parallel to the shafts 142 and 143. The shafts 142 and 143 are supported in the housing via radial bearings 146 and 147 and the second output shaft 144 by radial bearings 159 and 160. A clutch carrier 149 is non rotatingly arranged on the output shaft 143 over a gear 148. The carrier 149 carries the outer disks of a friction clutch arrangement 150. A sleeve 153 is rotatably mounted on one side by a needle bearing 151 on the shaft 142 and on the other side of the housing 141 by bearing 145. The inner disks of the clutch arrangement 150 are non rotatably arranged on the sleeve 153. The sleeve 153 is unitarily formed with a gear wheel 156. A chain 157 is in engagement with the gear wheel 156 and the gear wheel 158 on the shaft 144.

An electrical adjustable motor 162 is affixed to the drive housing 141. The motor shaft 163 includes a drive pinion 164 which engages the gear wheel 165. The gear wheel 165 is affixed to the shaft 166 which is mounted in the housing 141. The gear wheel 165 is in engagement with a support ring 168 mounted rotatably to the sleeve 153. The support ring 168 is supported on a ring 232 over an axial bearing 169 bound to the sleeve 153. The pressure ring 168 works over balls 171 led counterrotatingly in ball grooves of varying depth on a pressure ring 170. An axial nut 173 is the circumference of the ring in which a pin 172 radially engages it in the housing. The pressure ring 170 is thereby held axially shiftable and non rotatably across the housing 141. The pressure ring 170 acts on an axial bearing 174 and a ring 233 on the friction clutch arrangement 150 between the sleeve 153 and clutch carrier 149. The disks of the clutch arrangement 155 are supported on a ring 234 axially on the sleeve 153. The shaft 142 and the shaft 143 are sealed across the housing by gaskets 235 and 236, respectively. A flange 237 is fastened with a screw nut 238 to the shaft 143. The shaft 144 is sealed by means of a double gasket 239.

As further details, a ventilation arrangement 240, under which a baffle plate 241 is provided, are also shown. Outside the drive housing 141 an elastic suspension 242 is provided. An anterior shaft bearing 243 is recognizable on the shaft 163 of the adjustable motor 162. A further seal 259 is seen between the housing of the adjustable motor 162 and the drive housing 141.

Figure 5:
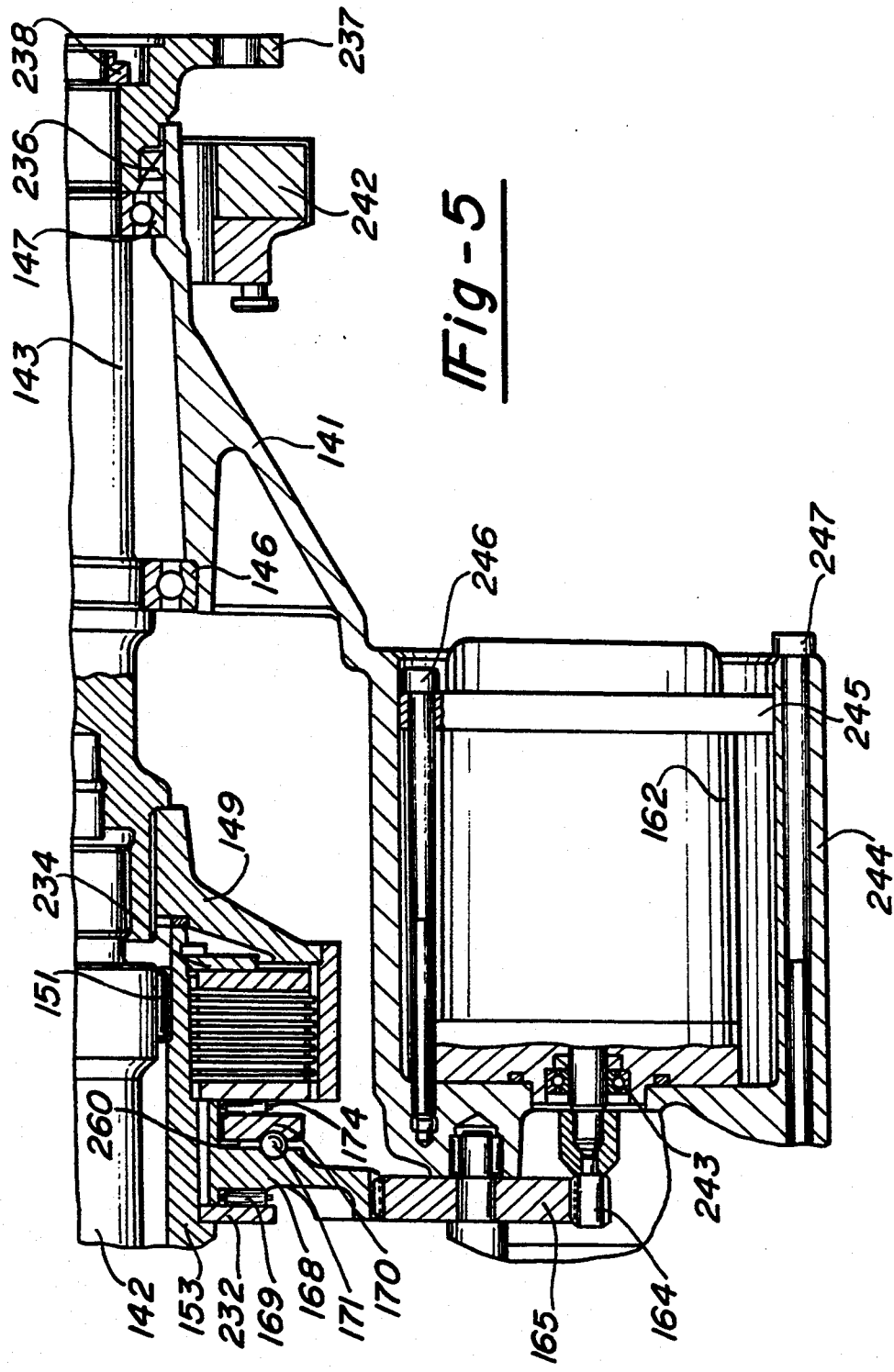
FIG. 5 is a sectional view of an arrangement of an adjustable motor similar to FIG. 4.

In FIG. 5, the same elements of FIG. 4 are identified with the same reference numerals. The difference is that a somewhat cylindrical flange 244 is provided on the drive housing 141. A cover 245 of the electric motor 162 is form-fitted and within and bolted onto the housing 141 with three circumferentially divided screws 246, one of which is visible. Further, a screw 247 is shown which is part of the connection of both halves of the housing 141. A disk shaped ball cage 260 is visible for the circumferentially divided support of the balls 171.

Figure 6:
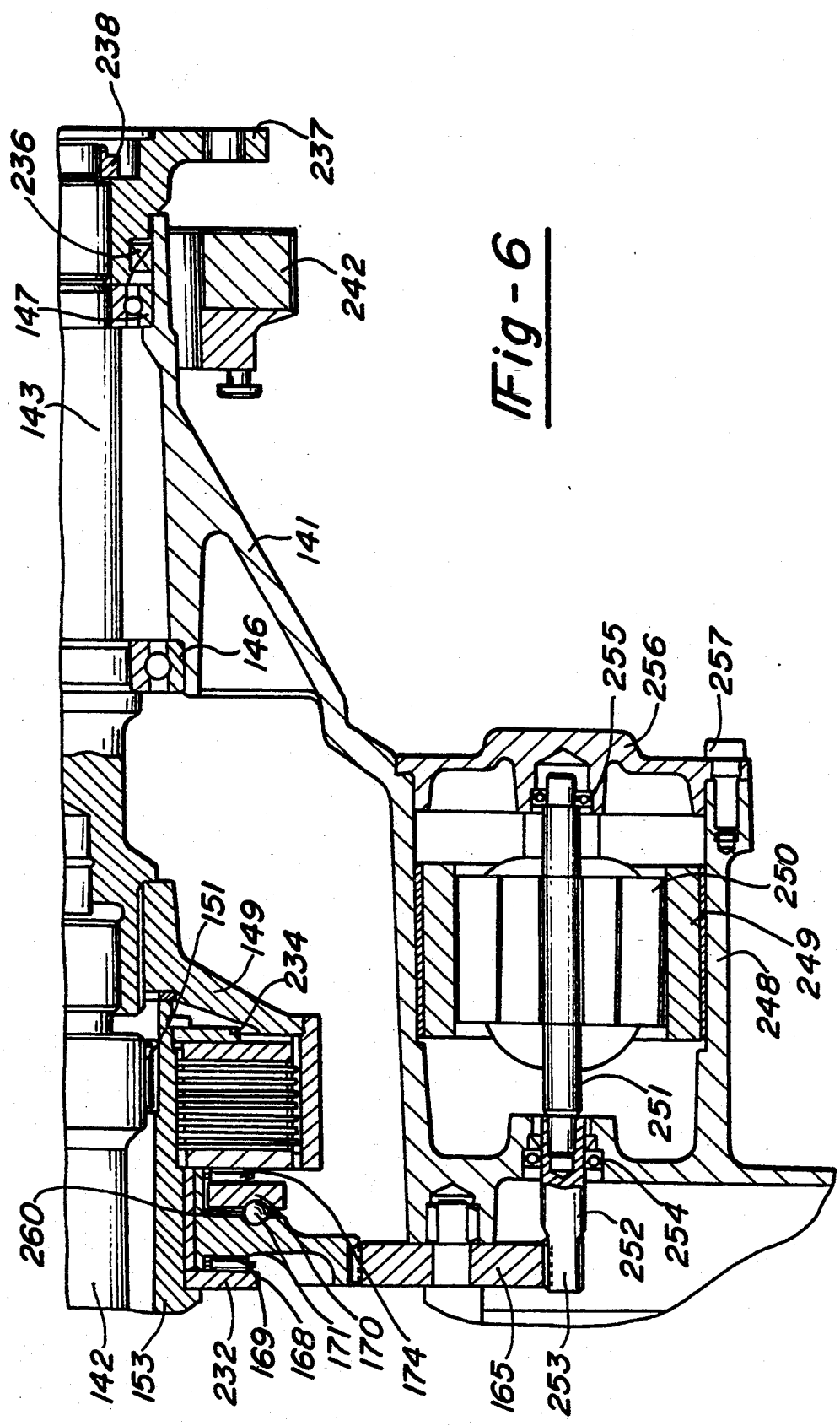
FIG. 6 is a sectional view of an arrangement of an adjustable motor similar to FIG. 4.

In FIG. 6, the same elements are provided with the same reference numerals as in FIG. 4. Different from FIGS. 4 and 5 is that a somewhat cylindrical flange 248 is provided on the housing 141. The flange 248 directly houses the stator coil 249 of the electric motor 162, of which further the detail of a rotor 250 is recognizable. The motor drive shaft 251 is hereby inserted in a shaft pin 252 which includes a pinion 253. The pin 252 is mounted by bearing 254 in the drive housing 141. The other end of the shaft 251 of the electric motor is mounted by bearing 255 in the cover 256. The cover 256 is securely bolted on to the cylindrical housing flange 248 with three circumferentially divided screws 257, one of which is recognizable. A disk shaped ball cage 260 to circumferentially divide support of the balls is likewise represented.

We claim:

1. A device for switching on a plurality of drive trains in a motor vehicle comprising:
    a housing;
    an input shaft rotatably mounted in said housing, said input shaft driven by an engine of said vehicle;
    a plurality of output shafts rotatably mounted in said housing;
    a first of said plurality of output shafts coupled with said input shaft for driving said first output shaft;
    a friction clutch rotatably mounted on said input shaft, said clutch including a plurality of disks;
    a first drive train coupled with said friction clutch for driving a second output shaft;
    a second drive train coupled with said friction clutch for engaging said friction clutch, said second drive train including a drive unit for independently driving said second drive train; and
    a pair of ring members rotatable 180° with respect to one another, said ring members coaxially positioned with respect to said clutch disks, said rings bearing against one another on paths which are variable around their periphery, one of said rings being rotatably by said second drive train and the other ring being axially movable to engage said clutch which, in turn, rotates said second output shaft.

2. A device according to claim 1 wherein said paths are ball grooves, and balls in a cage element are movable therein.

3. A device according to claim 1 wherein said paths are arranged in pairs in relatively counterrotating directions.

4. A device according to claim 1 wherein said paths have a variable radius around the periphery of said rings.

5. A device according to claim 1 wherein said paths are defined as ramps with bevel rollers in a cage element movable therebetween.

6. A device according to claim 1 wherein said path is a ramp on one ring and a contact cam on the other.

7. A device according to claim 1 wherein said drive unit is a rotatingly propelled adjustable motor for driving said second drive train.

8. A device according to claim 7 wherein said adjustable motor is an integral portion of the housing.

9. A device according to claim 8 wherein said adjustable motor is an electric motor whose housing is installed in a cylindrical flange in the housing.

10. A device according to claim 8 wherein said adjustable motor is an electric motor whose housing is fashioned directly from a cylindrical flange of the housing and including a separate cover.

11. A device according to claim 1 wherein said drive unit includes an adjustable motor in axial parallel arrangement with a shaft situated in the plane extending through the driveshaft.

12. A device according to claim 1 wherein said clutch is arranged in a housing common with the drive trains.

13. A device according to claim 1 wherein said clutch is in an axle housing especially with a differential drive of one of the switched on drive trains.

14. A device according to claim 1 wherein said clutch is coaxial to the input shaft and the output side of the clutch is a sleeve rotatably mounted on the input shaft, which remains in non rotatable engagement with the output shaft.

15. A device according to claim 1 wherein said clutch is coaxial to the output shaft, and the input side of the clutch is a sleeve rotatably mounted on the output shaft, which is in non rotatable engagement with the input shaft.

16. A device according to claim 1 wherein said first output and input shaft is a one-piece unit.

17. A device according to claim 16 wherein said first output shaft is coaxial with said input shaft and said second output shafts is parallel to it.

18. A device according to claim 17 wherein the said first drive includes a spur gear and an intermediate gear to drive said second output shaft.

19. A device according to claim 18 wherein said first drive includes a gear and a chain to drive said second output shaft.

20. A device according to claim 19 wherein said second drive train includes a gear on a shaft driven by a spur gear.

21. A device according to claim 19 wherein said second drive train includes a shaft led through the catenary of the chain.

* * * * *